(12) United States Patent
Mizuno et al.

(10) Patent No.: US 10,396,489 B2
(45) Date of Patent: Aug. 27, 2019

(54) GROMMET

(71) Applicants: NIFCO INC., Kanagawa (JP);
TOYOTA BOSHOKU KABUSHIKI KAISHA, Aichi (JP)

(72) Inventors: Kanako Mizuno, Kanagawa (JP);
Masato Arashi, Aichi (JP)

(73) Assignees: Nifco Inc., Kanagawa (JP); Toyota Boshoku Kabushiki Kaisha, Aichi (JP)

(*) Notice: Subject to any disclaimer, the term of this patent is extended or adjusted under 35 U.S.C. 154(b) by 0 days.

(21) Appl. No.: 15/988,078

(22) Filed: May 24, 2018

(65) Prior Publication Data

US 2018/0342830 A1 Nov. 29, 2018

(30) Foreign Application Priority Data

May 25, 2017 (JP) .................................. 2017-103747

(51) Int. Cl.
*H02G 3/22* (2006.01)
*H01R 13/52* (2006.01)
*H02G 15/013* (2006.01)
*B60R 16/02* (2006.01)

(52) U.S. Cl.
CPC ..... *H01R 13/5205* (2013.01); *B60R 16/0222* (2013.01); *H02G 3/22* (2013.01); *H02G 15/013* (2013.01)

(58) Field of Classification Search
CPC .. H02G 3/04; H02G 3/22; H02G 3/24; H02G 3/30; H02G 3/36; H02G 3/00; H02G 3/0487; H02G 15/013; H02G 15/00; H05K 13/00; B60R 16/0215; B60R 16/0207; B60R 16/0222; H01R 13/5205

USPC ........... 174/650, 152 G, 153 G, 135, 137 R, 174/72 A, 68.1, 68.3, 142; 16/2.1, 22; 248/56; 277/314, 602, 607, 628; 433/587, 271, 272, 273, 274, 275; 439/587, 271, 272, 273, 274, 275

See application file for complete search history.

(56) References Cited

U.S. PATENT DOCUMENTS

| | | | | |
|---|---|---|---|---|
| 5,071,143 A * | 12/1991 | Byerly | .................. | F16L 5/025 174/152 G |
| 5,811,728 A * | 9/1998 | Maeda | .................. | H02G 3/083 174/152 G |
| 6,051,795 A * | 4/2000 | Fisher | .................. | H02G 3/081 174/153 G |
| 6,897,380 B2 * | 5/2005 | Sakata | ................ | B60R 16/0222 174/153 G |
| 8,299,364 B2 * | 10/2012 | Suzuki | ................ | B60R 16/0222 174/153 G |

(Continued)

FOREIGN PATENT DOCUMENTS

JP 2016-116250 A 6/2016

*Primary Examiner* — Angel R Estrada
(74) *Attorney, Agent, or Firm* — Thomas|Horstemeyer, LLP (57) ABSTRACT

A grommet includes a body cylinder, an attachment cylinder, and a resilient retention portion. The body cylinder is configured such that a line shaped member is insertable therethrough. The attachment cylinder is provided at one end portion in an axis direction of the body cylinder and is configured to be attached to an opening formed at an attachment target. The resilient retention portion is provided between the body cylinder and the attachment cylinder, and is configured to resiliently deform to abut and retain the line shaped member.

6 Claims, 11 Drawing Sheets

(56) References Cited

U.S. PATENT DOCUMENTS 8,461,457 B2 * 6/2013 Miyakoshi .............. H02G 3/22
174/153 G
8,981,228 B2 * 3/2015 Okuhara .................. F16L 5/10
174/152 G

* cited by examiner

GROMMET

CROSS-REFERENCE TO RELATED APPLICATION

This application is based on and claims priority under 35 USC 119 from Japanese Patent Application No. 2017-103747 filed on May 25, 2017, the disclosure of which is incorporated by reference herein.

BACKGROUND

Technical Field

The present disclosure relates to a grommet used to retain a line shaped member such as a wire on an attachment target such as a plate, while avoiding interference between the two.

Related Art

Japanese Patent Application Laid-Open (JP-A) No. 2016-116250 discloses a grommet that is capable of retaining a seatback spring (line shaped member) at a reduced diameter portion formed at an inner peripheral portion of a boundary between a body cylinder and an attachment cylinder. Plural projections are formed projecting from the reduced diameter portion at intervals in a circumferential direction. The line shaped member is retained by the grommet by abutting these projections.

However, in the grommet disclosed in JP-A No. 2016-116250, since the seatback spring is retained by the plural projections formed projecting from the reduced diameter portion, there is a concern that, depending on the diameter of the seatback spring, play (movement) between the seatback spring and the projections might cause noise.

SUMMARY

In consideration of the above circumstances, an object of one aspect of the present disclosure is to provide a grommet capable of retaining a line shaped member while suppressing play.

A grommet of a first aspect of the present disclosure includes a body cylinder, an attachment cylinder, and a resilient retention portion. The body cylinder is configured such that a line shaped member is insertable therethrough. The attachment cylinder is provided at one end portion in an axis direction of the body cylinder and is configured to be attached to an opening formed at an attachment target. The resilient retention portion is provided between the body cylinder and the attachment cylinder, and is configured to resiliently deform to abut and retain the line shaped member.

In the grommet of the first aspect, when the line shaped member is inserted, the resilient retention portion resiliently deforms due to abutting the line shaped member, facilitating insertion of the line shaped member. Moreover, after insertion of the line shaped member (after the line shaped member has been inserted into the grommet, and the grommet has been disposed at a predetermined position on the line shaped member), the line shaped member is restrained (restricted from moving) and retained by the grommet due to recovery force (spring-back force) of the resilient retention portion. The grommet of the first aspect is accordingly able to retain the line shaped member while suppressing play in the inserted line shaped member.

A grommet of a second aspect of the present disclosure is the grommet of the first aspect, wherein a plural of the resilient retention portions are provided at intervals in a circumferential direction.

In the grommet of the second aspect, due to providing the plural resilient retention portion at intervals in the circumferential direction of the grommet, play in the line shaped member can be suppressed compared, for example, to configurations in which the line shaped member is retained by a single resilient retention portion.

A grommet of a third aspect of the present disclosure is the grommet of the first aspect or the second aspect, wherein the resilient retention portion is a plate-shaped resilient tab having one end supported by the body cylinder and having another end supported by the attachment cylinder.

In the grommet of the third aspect, due to one end of a resilient tab that is the resilient retention portion being supported by the body cylinder and the other end thereof being supported by the attachment cylinder, the length of the resilient tab can be set long. This means that it is easier for the line shaped member to abut the resilient tab, enabling the line shaped member to be retained while further suppressing play thereof.

A grommet of a fourth aspect of the present disclosure is the grommet of the third aspect, wherein a through hole is formed so as to span from the body cylinder to the attachment cylinder, and the resilient tab is disposed inside the through hole such that the one end of the resilient tab is connected to an edge on the body cylinder side of the through hole, and the other end of the resilient tab is connected to an edge on the attachment cylinder side of the through hole.

In the grommet of the fourth aspect, the resilient tab is disposed inside the through hole formed so as to span from the body cylinder to the attachment cylinder, such that the one end of the resilient tab is connected to the edge on the body cylinder side of the through hole, and the other end of the resilient tab is connected to the edge on the attachment cylinder side of the through hole. Thus by disposing the resilient tab inside the through hole in this manner, it is possible to increase the amount of resilient deformation of the resilient tab supported at two ends, thereby enabling any variation in the diameter of the line shaped member to be better absorbed.

A grommet of a fifth aspect of the present disclosure is the grommet of any one of the first aspect to the fourth aspect, wherein an abutting face of the resilient retention portion, which abuts the line shaped member is curved with a concave profile as viewed in cross-section taken in a direction orthogonal to the axis direction.

In the grommet of the fifth aspect, due to the abutting face of the resilient retention portion, which abuts the line shaped member being curved with a concave profile as viewed in cross-section taken in a direction orthogonal to the axis direction, for example, the abutting surface area between the line shaped member and the resilient retention portion is increased in comparison, for example, to a configuration in which the abutting surface is curved with a convex profile, enabling play in the line shaped member to be effectively suppressed, and moreover improving the retention force on the line shaped member.

A grommet of a sixth aspect of the present disclosure is the grommet of any one of the first aspect to the fifth aspect, wherein both an inner peripheral face of the body cylinder and an inner peripheral face of the attachment cylinder are configured with a cone-shaped profile decreasing in diameter on progression toward a boundary between the body cylinder and the attachment cylinder.

In the grommet of the sixth aspect, due to both the inner peripheral face of the body cylinder and the inner peripheral face of the attachment cylinder being configured with a cone-shaped profile, a configuration can be achieved in which it is easy to insert the line shaped member into the grommet, and it is possible to more stably retain the line shaped member even in cases in which the line shaped member is inclined with respect to the axis direction of the grommet.

A grommet of a seventh aspect of the present disclosure is the grommet of any one of the first aspect to the sixth aspect, further including an engagement portion that is formed at an outer periphery of the attachment cylinder, and that is configured to engage with a peripheral edge of the opening by resiliently deforming.

In the grommet of the seventh aspect, when the attachment cylinder is inserted into the opening in the attachment target, the engagement portion engages with the peripheral edge of the opening by resiliently deforming, enabling the grommet to be attached to the attachment target. Thereby, with the grommet as described above, the grommet (attachment cylinder) can be reliably attached to the attachment target by a simple operation of inserting the attachment cylinder into the opening of the attachment target.

Thus an aspect of the present disclosure enables provision of a grommet capable of retaining a line shaped member while suppressing play.

BRIEF DESCRIPTION OF THE DRAWINGS

Exemplary embodiments of the present invention will be described in detail based on the following figures, wherein.

DETAILED DESCRIPTION

Explanation follows regarding a grommet according to an exemplary embodiment of the present disclosure, with reference to FIG. 1 to FIG. 11. The grommet of the present exemplary embodiment is employed in a vehicle seat 10, illustrated in FIG. 1, described in detail later. First, explanation will be given regarding the vehicle seat in which the grommet of the present exemplary embodiment is employed, and this will be followed by explanation regarding the grommet of the present exemplary embodiment. Note that in FIG. 1 to FIG. 11, the arrow UP indicates an upward direction of the vehicle seat (seat) to which the grommet is attached, and the arrow IN indicates a width direction inside of the vehicle seat, as appropriate.

Figure 1:
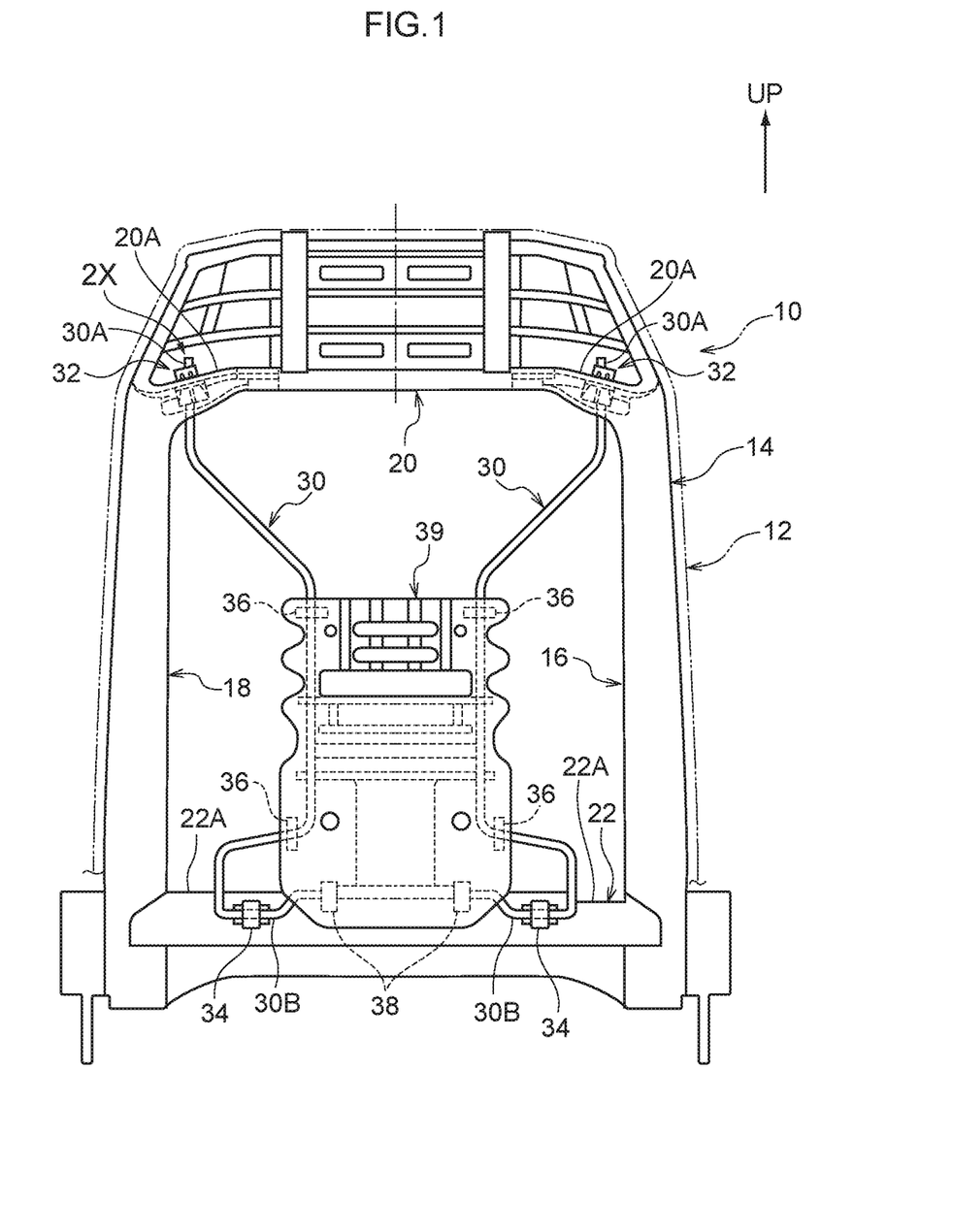
FIG. 1 is a schematic diagram illustrating a seatback frame applied with a grommet according to an exemplary embodiment of the present disclosure, as viewed from the rear of a vehicle.

As illustrated in FIG. 1, the vehicle seat 10 of the present exemplary embodiment includes a seat cushion (not illustrated in the drawings) on which an occupant sits, and a seatback 12 that supports the back of the occupant seated on the vehicle seat 10.

A seatback frame 14 configuring framework of the seatback 12 is provided inside the seatback 12. The seatback frame 14 includes left and right side frames 16, 18, an upper frame 20 spanning between upper ends of the left and right side frames 16, 18, and a lower frame 22 spanning between lower ends of the left and right side frames 16, 18.

Seatback springs 30 serving as hard line shaped members made from metal wires or the like are provided spanning between the two end portions 20A of the upper frame 20 and the two end portions 22A of the lower frame 22. Upper end portions 30A of the respective seatback springs 30 are attached to the two end portions 20A of the upper frame 20 through grommets 32 of the present exemplary embodiment. Note that lower ends 30B of the respective seatback springs 30 are attached to the two end portions 22A of the lower frame 22 through clips 34. A seatback panel 39 is fixed to the seatback springs 30 through clips 36, 38.

Grommet

Figure 2:
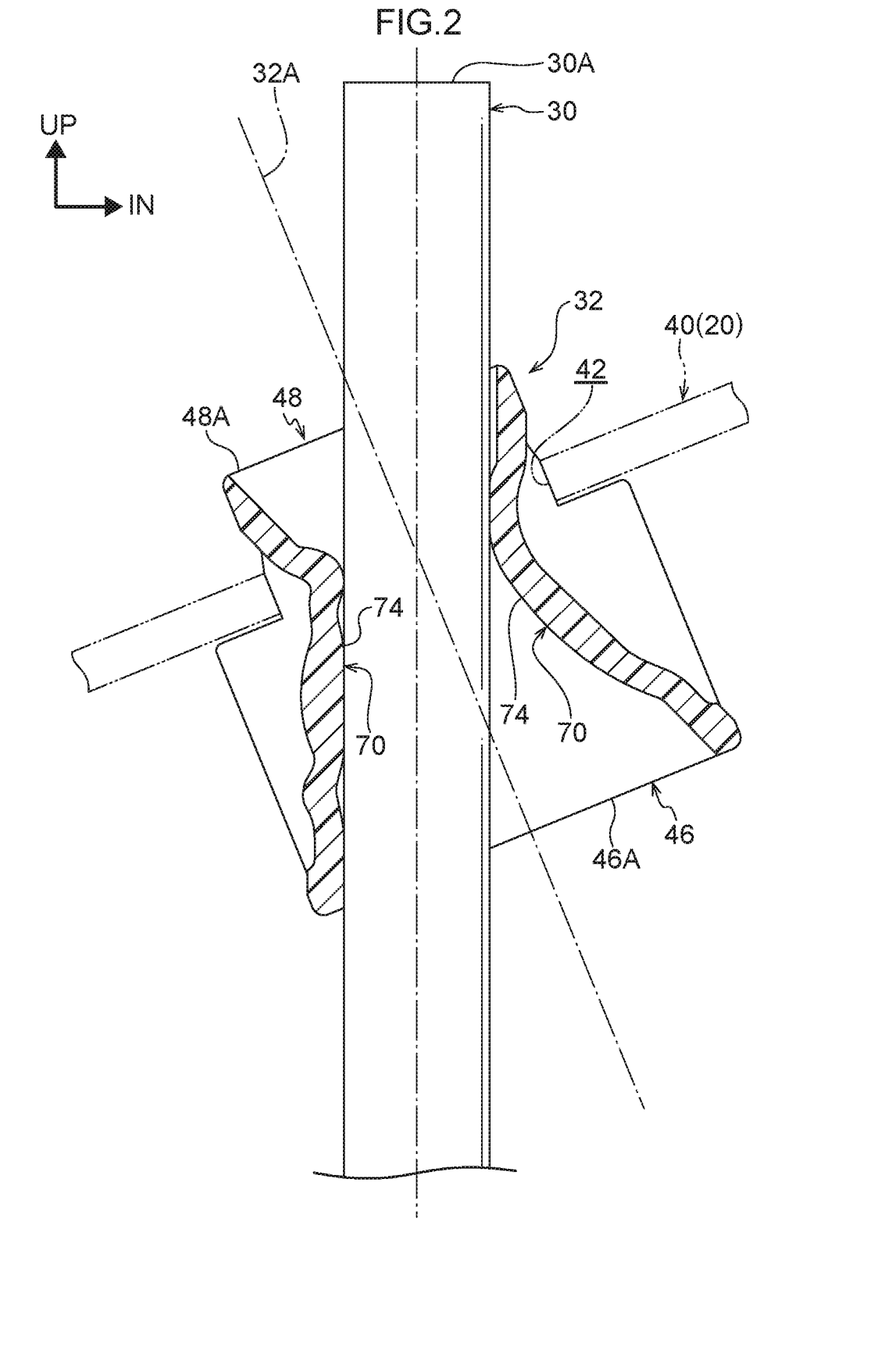
FIG. 2 is a cross-section of a grommet disposed at the portion indicated by arrow 2X in FIG. 1.
Figure 3:
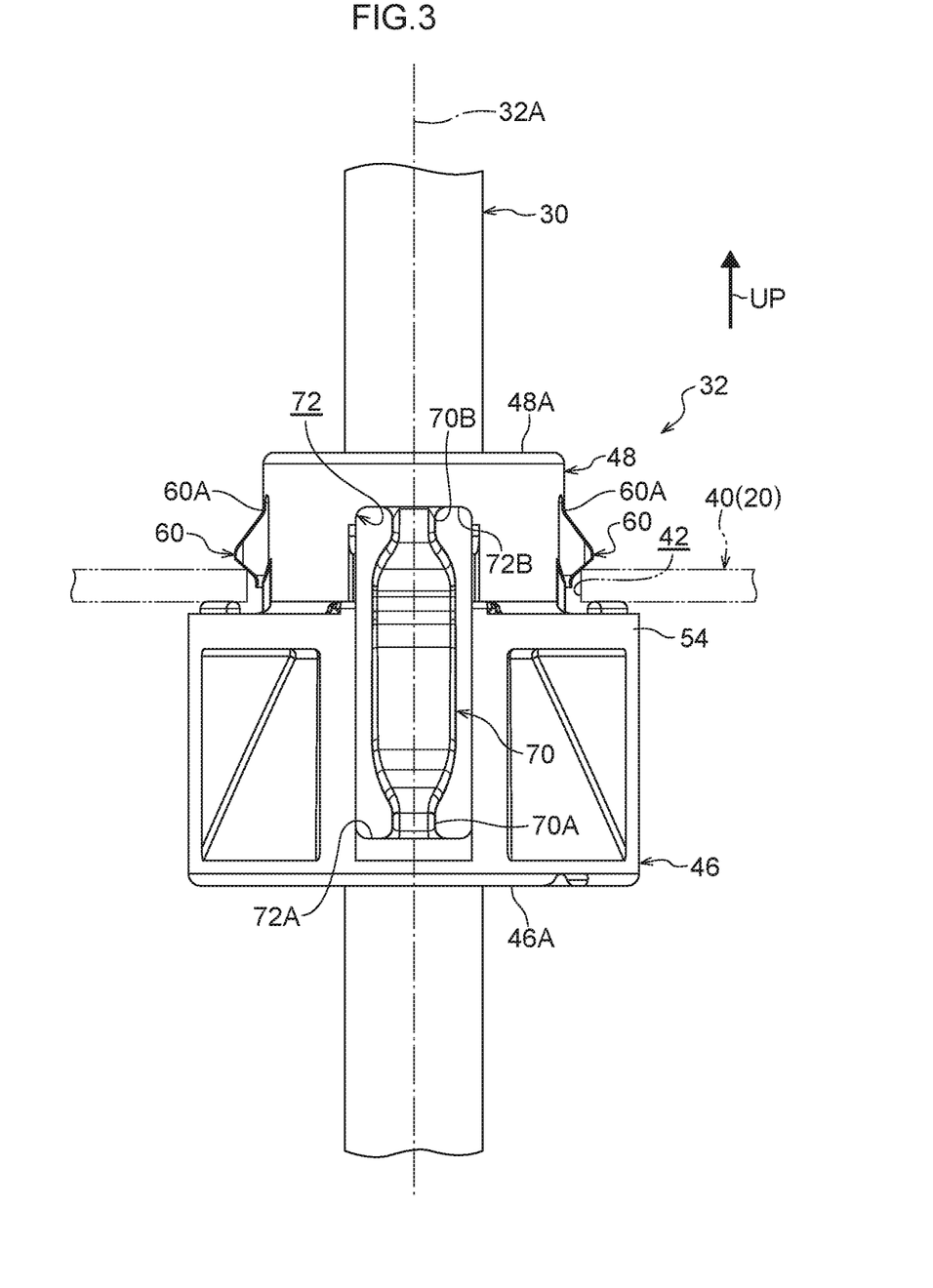
FIG. 3 is a side view of a grommet disposed at the portion indicated by arrow 2X in FIG. 1, as viewed from a vehicle width direction inside.

As illustrated in FIG. 2 and FIG. 3, the grommet 32 of the present exemplary embodiment is made from resin, and is capable of being attached to a circular opening (circular hole) 42 formed at an attachment portion 40 of the upper frame 20, serving as an example of an attachment target. Note that the attachment portion 40 of the upper frame 20 configures an inclined face that is inclined from the seat width direction upper inside toward the seat width direction lower outside.

Figure 4:
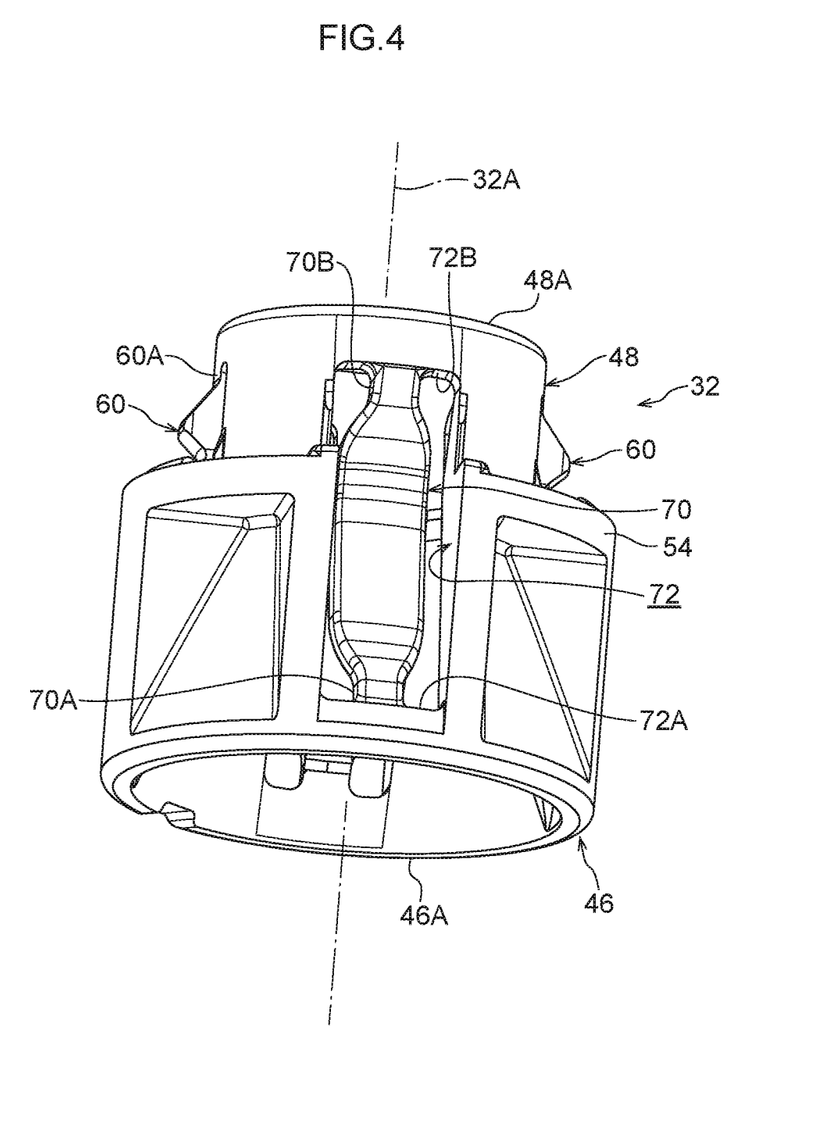
FIG. 4 is a perspective view illustrating a grommet according to an exemplary embodiment of the present disclosure.
Figure 5:
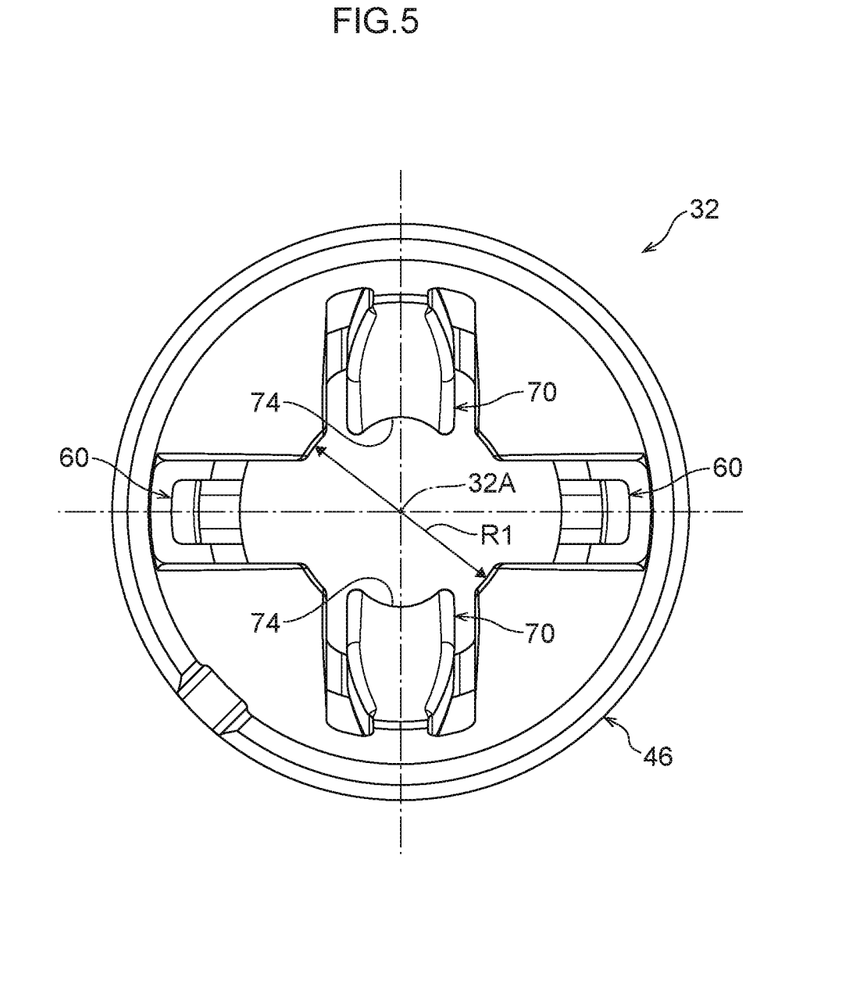
FIG. 5 is a front-face view illustrating the grommet of FIG. 4, as viewed from one axis direction (body cylinder side)
Figure 6:
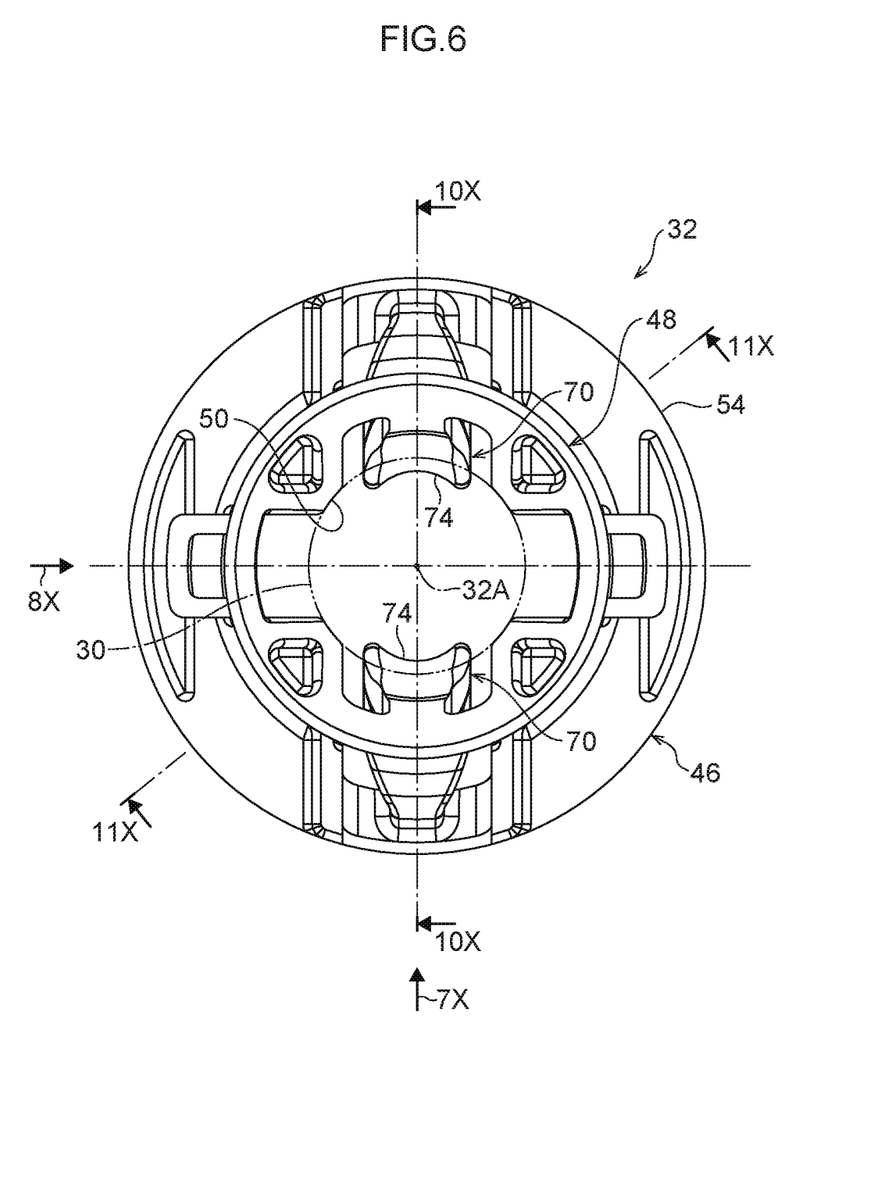
FIG. 6 is a back-face view illustrating the grommet of FIG. 4, as viewed from the other axis direction (attachment cylinder side)
Figure 7:
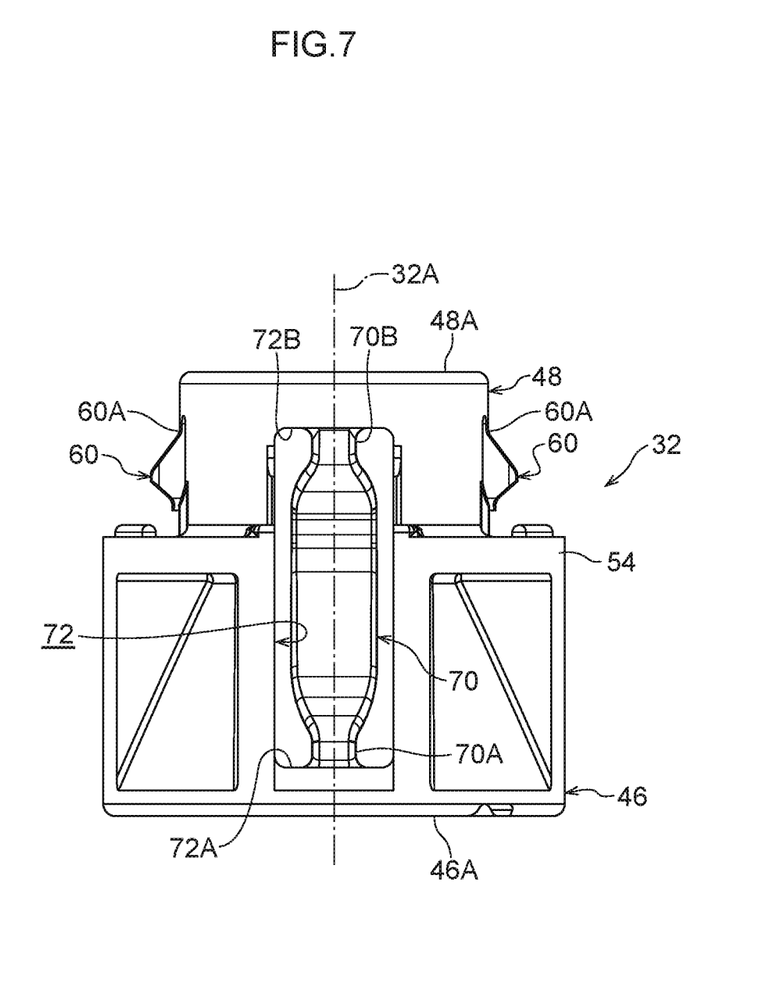
FIG. 7 is a side view illustrating the grommet of FIG. 6, as viewed along the direction of arrow 7X.
Figure 8:
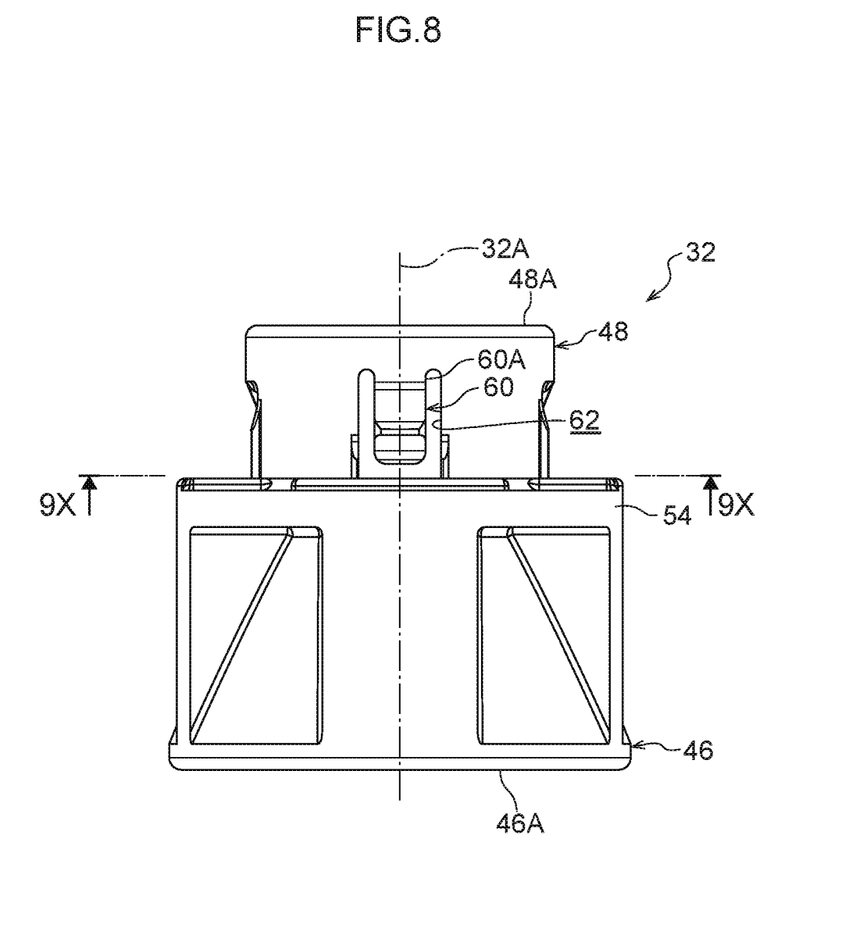
FIG. 8 is a side view illustrating the grommet of FIG. 6, as viewed along the direction of arrow 8X.

As illustrated in FIG. 5 and FIG. 6, the grommet 32 has a cylinder shape with a circular cross-section profile as viewed in a direction along an axis 32A of the grommet 32 (referred to hereafter as the "axis direction" as appropriate). The seatback spring 30 (see FIG. 2), serving as an example of a line shaped member, is capable of being inserted through the inside of the cylinder shape. As illustrated in FIG. 3, FIG. 4, and FIG. 7, a body cylinder 46 is configured at one axis direction side of the grommet 32, and an attachment cylinder 48 is configured at the other axis direction side of the grommet 32. In other words, the attachment cylinder 48 is provided at one axis direction end portion of the body cylinder 46.

Figure 11:
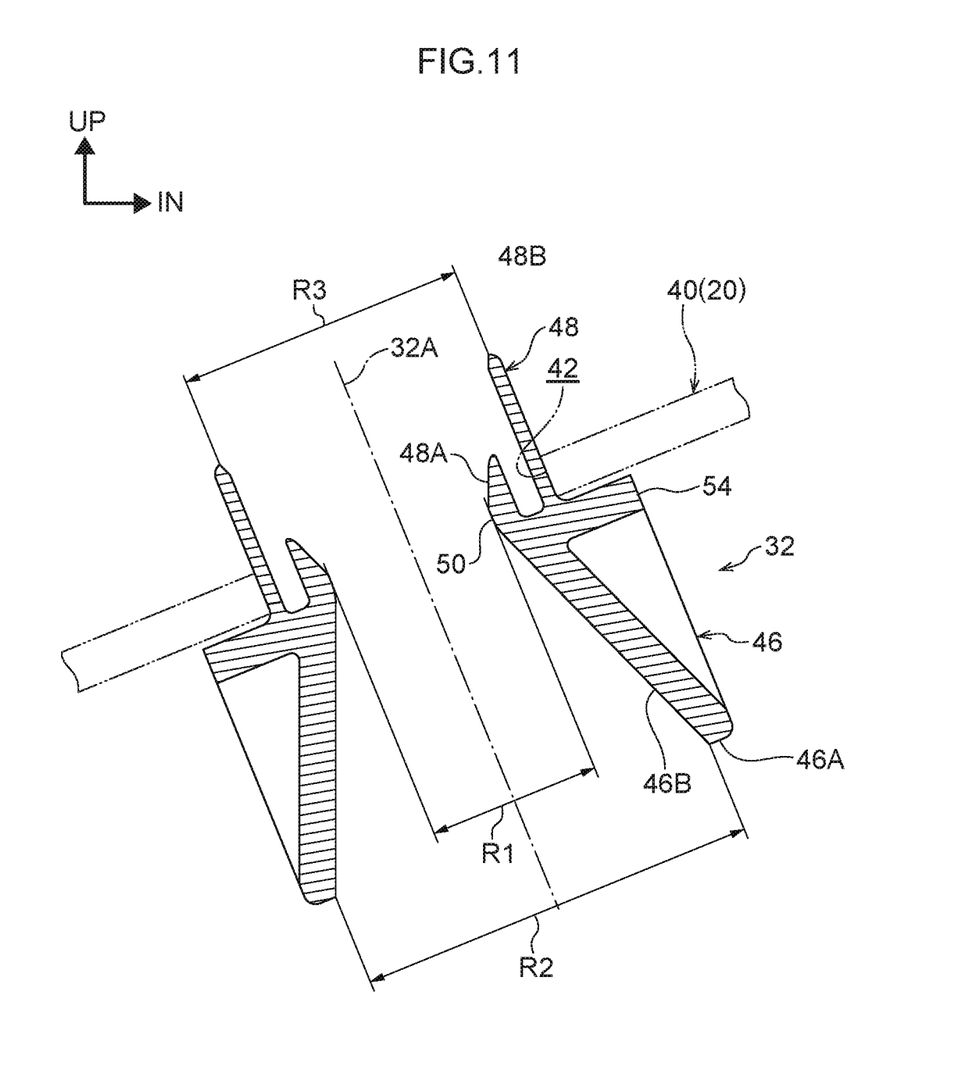
FIG. 11 is a cross-section of the grommet of FIG. 6, taken along line 11X-11X.

As illustrated in FIG. 11, a reduced diameter portion 50 is formed at the inner periphery of a boundary between the body cylinder 46 and the attachment cylinder 48 of the grommet 32. An internal diameter R1 of the reduced diameter portion 50 is smaller than both an internal diameter R2 of the body cylinder 46 and an internal diameter R3 of the attachment cylinder 48 (R1<R2, R3). Note that the internal diameter of the body cylinder 46 at an end portion 46A on the opposite side to the attachment cylinder 48 is larger than the internal diameter of the attachment cylinder 48 at an end portion 48A on the opposite side to the body cylinder 46.

Moreover, in the present exemplary embodiment, both an inner peripheral face 46B of the body cylinder 46 and an inner peripheral face 48B of the attachment cylinder 48 have a cone-shaped decreasing in diameter on progression toward the boundary between the body cylinder 46 and the attachment cylinder 48 (the reduced diameter portion 50).

As illustrated in FIG. 11, a flange 54 is formed at an outer periphery of the boundary between the attachment cylinder 48 and the body cylinder 46, so as to protrude in a ring shape toward the radial direction outside.

As illustrated in FIG. 3 and FIG. 7, engagement claws 60, serving as examples of engagement portions, are formed at the outer periphery of the attachment cylinder 48. The engagement claws 60 are formed at two locations at equal intervals in the circumferential direction of the grommet 32. Moreover, a continuous notch 62 (see FIG. 8) is formed on both circumferential direction sides of each engagement claw 60 and on the flange 54 side thereof. Each of the engagement claws 60 is able to resiliently deform toward the radial direction outside and the radial direction inside of the attachment cylinder 48 due to a hinge 60A formed at each of the engagement claws 60 on the opposite side to the flange 54.

As illustrated in FIG. 3, each engagement claw 60 has a peaked shape as viewed in a direction along the circumferential direction of the grommet 32, and the engagement claws 60 are able to engage with a peripheral edge of an opening 42 in the attachment portion 40 of the upper frame 20 by resiliently deforming. Specifically, when the attachment cylinder 48 is inserted into the opening 42 of the attachment portion 40, the engagement claws 60 slide against the opening 42 and resiliently deform toward the radial direction inside of the attachment cylinder 48. The engagement claws 60 then return toward the radial direction outside, such that the peripheral edge of the opening 42 of the attachment portion 40 is gripped between the engagement claws 60 and the flange 54.

As illustrated in FIG. 2 to FIG. 4, resilient tabs 70, serving as an example of resilient retention portions that are configured to resiliently deform to abut and retain the seatback spring 30, are provided between the body cylinder 46 and the attachment cylinder 48. Plural of the resilient tabs 70 are provided at intervals in the circumferential direction of the grommet 32 (two are provided at equal intervals in the present exemplary embodiment).

Figure 10:
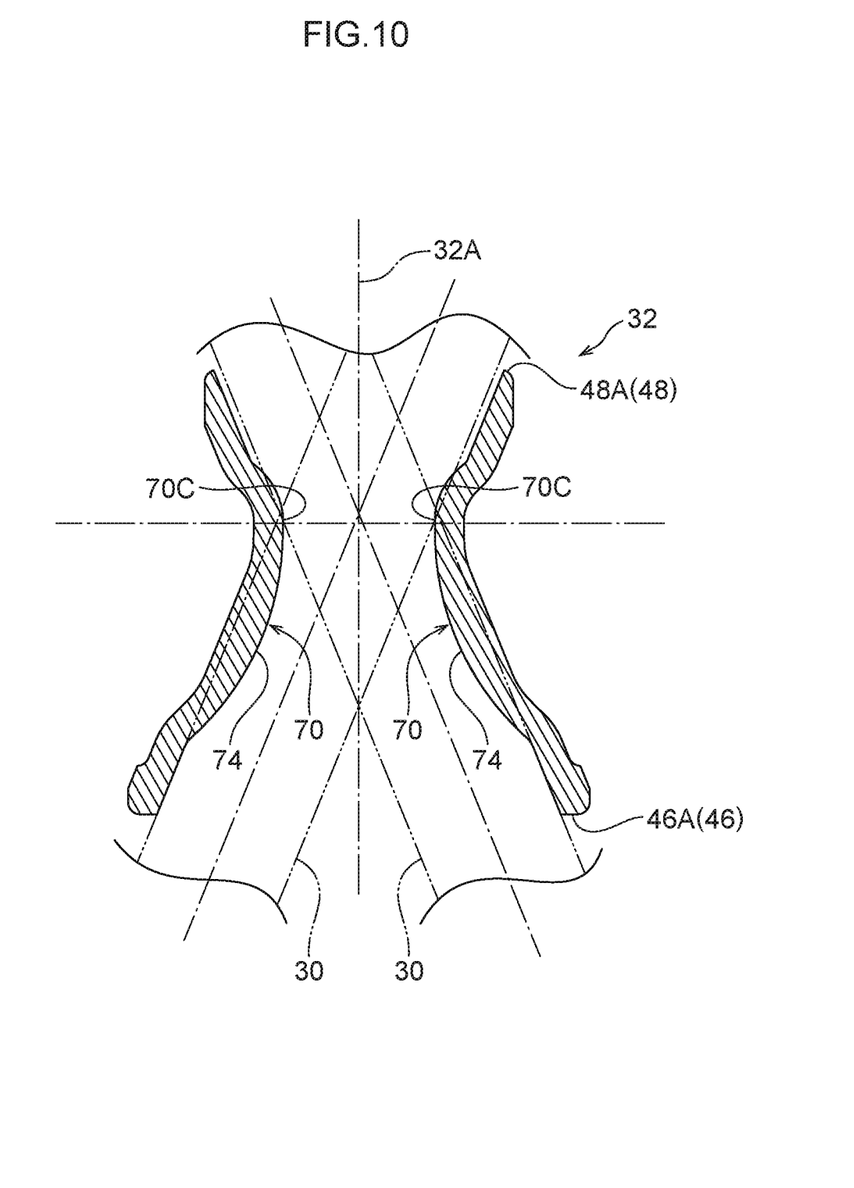
FIG. 10 is a cross-section of the grommet of FIG. 6, taken along line 10X-10X.

As illustrated in FIG. 4, FIG. 7, and FIG. 10, each resilient tab 70 is plate shaped, and one length direction end 70A (the lower end in the present exemplary embodiment) thereof is supported by the body cylinder 46. The other end 70B (the upper end in the present exemplary embodiment) is supported by the attachment cylinder 48. Specifically, in the grommet 32, plural through holes 72 extending along the axis direction from the body cylinder 46 to the attachment cylinder 48 are formed at the grommet 32 at intervals in the circumferential direction of the grommet 32 (two are formed at equal intervals in the present exemplary embodiment). The resilient tabs 70 are disposed inside corresponding through holes 72, and the one end 70A of each resilient tab 70 is connected to an edge 72A on the body cylinder 46 side of the through hole 72. The other end 70B is connected to an edge 72B on the attachment cylinder 48 side of the through hole 72. Note that in the present exemplary embodiment, the resilient tabs 70 are formed by integrally molding to the body cylinder 46 and the attachment cylinder 48.

Figure 9:
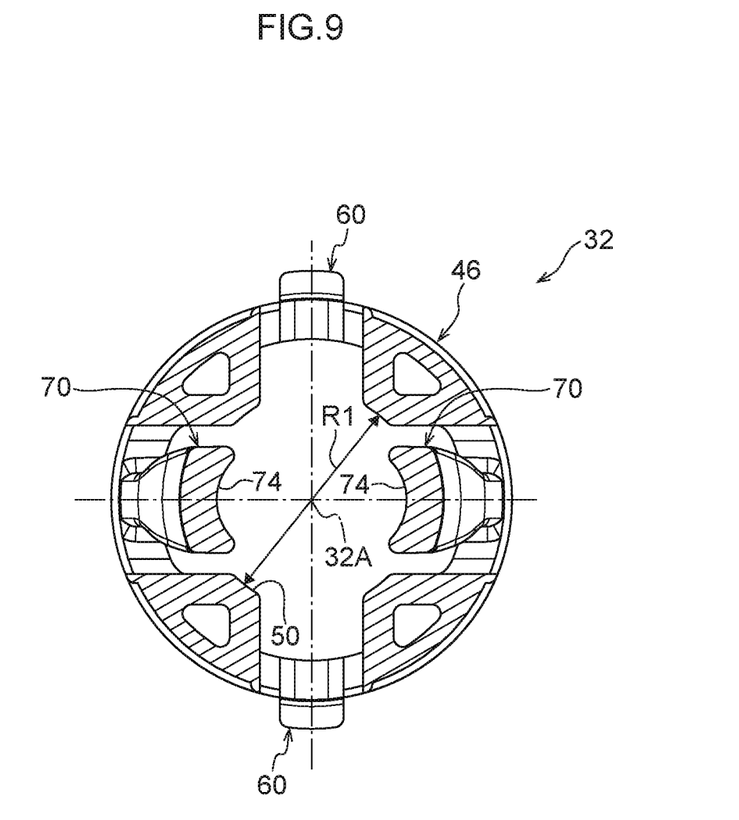
FIG. 9 is a cross-section of the grommet of FIG. 8, taken along line 9X-9X.

As illustrated in FIG. 9, an abutting face 74 of the resilient tab 70 is curved with a concave profile, as viewed in cross-section taken in a direction orthogonal to the axis direction, and abuts the seatback spring 30. Moreover, the abutting face 74 of each resilient tab 70 is positioned further toward the axis 32A side (radial direction inside of the grommet 32) than an inner peripheral face of the grommet 32 as viewed in cross-section taken in a direction orthogonal to the axis 32A of the grommet 32. This configuration enables the resilient tabs 70 to be reliably caused to abut the seatback spring 30 when the seatback spring 30 has been inserted into the grommet 32.

As illustrated in FIG. 10, as viewed in cross-section taken along the axis direction, the abutting face 74 of each resilient tab 70 is inclined from the one end 70A and the other end 70B toward a location corresponding to the boundary between the body cylinder 46 and the attachment cylinder 48, such that this location (referred to hereafter as the "close proximity location" as appropriate) 70C is closest to the axis 32A. This configuration facilitates insertion of the seatback spring 30 into the grommet 32.

Next, explanation follows regarding operation of the present exemplary embodiment.

During insertion of the seatback spring 30 into the grommet 32, due to abutting the seatback spring 30, the resilient tabs 70 are pressed toward the radial direction outside of the grommet 32 and resiliently deform. This makes insertion of the seatback spring 30 into the grommet 32 easier than, for example, configurations in which locations abutted by the seatback spring 30 do not resiliently deform.

Moreover, after insertion of the seatback spring 30 (after the seatback spring 30 has been inserted into the grommet 32 and the grommet 32 has been disposed at a predetermined position on the seatback spring 30), the seatback spring 30 is restrained (restricted from moving) and retained by the grommet 32 due to recovery force (spring-back force) of the resilient deformation of the resilient tabs 70. In this manner, the grommet 32 is capable of retaining the seatback spring 30 while suppressing play in the inserted seatback spring 30. Noise caused by play in the seatback spring 30 is thus suppressed from occurring.

Moreover, in the grommet 32, plural of the resilient tabs 70 are provided at intervals in the circumferential direction of the grommet 32. This thereby enables play in the seatback spring 30 to be better suppressed than, for example, configurations in which the seatback spring 30 is retained by a single resilient tab 70. Moreover, the retention force on the seatback spring 30 is increased by the resilient tabs 70.

In the grommet 32, the one end 70A of each resilient tab 70 is supported by the body cylinder 46, and the other end 70B of each resilient tab 70 is supported by the attachment cylinder 48. This thereby enables a longer length to be set for the resilient tabs 70. This makes it easier for the seatback spring 30 to abut the resilient tabs 70, enabling the seatback spring 30 to be retained while suppressing play even more effectively.

Moreover, in the grommet 32, the resilient tabs 70 are disposed inside the through holes 72 formed spanning from the body cylinder 46 to the attachment cylinder 48. The one end 70A of each resilient tab 70 is connected to the edge 72A of the corresponding through hole 72, and the other end 70B of each resilient tab 70 is connected to the edge 72B of the through hole 72. In this manner, by disposing the resilient tabs 70 inside the respective through holes 72, the amount of resilient deformation of the resilient tabs 70 supported at the one ends 70A and the other ends 70B (the resilient deformation amount in the radial direction of the grommet 32) can be increased, thereby enabling play at the radial outside of the seatback spring 30 to be better absorbed.

Moreover, in the grommet 32, the abutting face 74 of each resilient tab 70 is curved with a concave profile as viewed in cross-section taken in a direction orthogonal to the axis direction. This thereby increases the abutting surface area between the seatback spring 30 and the resilient tabs 70 than, for example, in a configuration in which the abutting faces 74 are curved with convex profiles. Play in the seatback spring 30 can accordingly be more effectively suppressed, and the retention force on the seatback spring 30 is also increased.

Moreover, in the grommet 32, both the inner peripheral face 46B of the body cylinder 46 and the inner peripheral face 48B of the attachment cylinder 48 have cone-shaped profiles. This enables easier insertion of the seatback spring 30 into the grommet 32, and enables the seatback spring 30 to be more stably retained even in cases in which the seatback spring 30 is inclined with respect to the axis direction of the grommet 32.

Moreover, in the grommet 32, when the attachment cylinder 48 is inserted into the opening 42 in the attachment portion 40, the engagement claws 60 resiliently deform so as to engage with the peripheral edge of the opening 42, thereby enabling the grommet 32 to be attached to the attachment portion 40. The grommet 32 can thereby be reliably attached to the attachment portion 40 of the upper frame 20 by a simple operation of the grommet 32 to insert the attachment cylinder 48 into the opening 42 in the attachment portion 40.

Moreover, when attaching the seatback springs 30 to the vehicle seat 10, first, each of the seatback springs 30 is passed through the respective grommet 32, and then the upper end portion 30A of the seatback spring 30 is passed through the opening 42 in the attachment portion 40. Next, the grommet 32 is slid along the seatback spring 30, and the attachment cylinder 48 is inserted into the opening 42 so as to attach the grommet 32 to the upper frame 20. The seatback spring 30 is thus attached to the vehicle seat 10 through the grommet 32.

Attachment of the grommet 32 to the attachment portion 40 is facilitated due to sliding the grommet 32 after the upper end portion 30A of the seatback spring 30, which has passed through the grommet 32, has already passed through the opening 42. This thereby enables problems with attachment between the grommet 32 and the attachment portion 40 to be suppressed from occurring.

Other Exemplary Embodiments

Detailed explanation has been given above regarding a specific exemplary embodiment of the present disclosure. However, the present disclosure is not limited to the above exemplary embodiment, and it is obvious to a practitioner skilled in the art that various other exemplary embodiments are possible within the scope of the present disclosure. For example, in the exemplary embodiment described above, the resilient tabs 70 are formed by integrally molding to the body cylinder 46 and the attachment cylinder 48. Alternatively, one end of a resilient tab that is a separated body may be attached to the body cylinder 46, and the other end of the resilient tab may be attached to the attachment cylinder 48. Moreover, the material used to configure a separate resilient tab body may be a softer material than the material used to configure the body cylinder 46 and the attachment cylinder 48. Moreover, the material used to configure the resilient tab 70 may be a softer material than the material used to configure the body cylinder 46 and the attachment cylinder 48, and the resilient tab 70 may be integrally molded to the body cylinder 46 and the attachment cylinder 48 using two-color molding.

Moreover, in the exemplary embodiment described above, the through holes 72 are formed at the grommet 32, and the resilient tabs 70 are disposed inside the through holes 72. The one ends 70A are connected to the edges 72A, and the other ends 70B are connected to the edges 72B. Alternatively, a configuration may be adopted in which the one end 70A of each resilient tab 70 is connected to the inner peripheral face 46B of the body cylinder 46 and the other end 70B of each resilient tab 70 is connected to the inner peripheral face 48B of the attachment cylinder 48, without forming the through holes 72 in the grommet 32. Moreover, a configuration may be adopted in which plate shaped resilient members (such as rubber or felt) that are configured to resiliently deform are disposed at intervals in the circumferential direction of the grommet 32, so as to span along an inner peripheral face of the grommet 32 from the body cylinder 46 to the attachment cylinder 48.

Moreover, in the exemplary embodiment described above, two of the resilient tabs 70 are provided at intervals in the circumferential direction at the inner peripheral face of the grommet 32. However, one, or three or more, of the resilient tabs 70 may be provided.

Moreover, in the exemplary embodiment described above, both the inner peripheral face 46B of the body cylinder 46 of the grommet 32 and the inner peripheral face 48B of the attachment cylinder 48 of the grommet 32 have cone-shaped profiles. However, configuration may be made in which either one of the inner peripheral face 46B or the inner peripheral face 48B has a cone-shaped profile.

Moreover, in the exemplary embodiment described above, the abutting face 74 of each resilient tab 70 is curved with a concave profile as viewed in cross-section taken in a direction orthogonal to the axis direction. Alternatively, the abutting faces 74 may be curved with a convex profile, or may have a straight line profile.

Moreover, in the exemplary embodiment described above, the grommet 32 is applied to the attachment of the seatback spring 30, serving as a line shaped member, to the upper frame 20, serving as an example of an attachment target. However, the line shaped member is not limited to being a seatback spring 30, and may be another line shaped member such as a wire. Moreover, the attachment target of the present disclosure is not limited to the upper frame 20, and configuration may be made with another attachment target, such as the lower frame 22.

Moreover, the grommet of the present disclosure may also be applied to structural bodies other than a vehicle seat.

All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A grommet comprising:
   a body cylinder configured such that a line shaped member is insertable therethrough;
   an attachment cylinder that is provided at one end portion in an axis direction of the body cylinder, and that is configured to be attached to an opening formed at an attachment target; and
   a resilient retention portion that is provided between the body cylinder and the attachment cylinder, and that is configured to resiliently deform to abut and retain the line shaped member, wherein the resilient retention portion is a plate-shaped resilient tab having one end supported by the body cylinder and having another end supported by the attachment cylinder.

2. The grommet of claim 1, wherein a plurality of resilient retention portions are provided at intervals in a circumferential direction.

3. The grommet of claim 1, wherein:
a through hole is formed so as to span from the body cylinder to the attachment cylinder; and
the resilient tab is disposed inside the through hole such that the one end of the resilient tab is connected to an edge on the body cylinder side of the through hole, and the other end of the resilient tab is connected to an edge on the attachment cylinder side of the through hole.

4. The grommet of claim 1, wherein an abutting face of the resilient retention portion, which abuts the line shaped member, is curved with a concave profile as viewed in cross-section taken in a direction orthogonal to the axis direction.

5. The grommet of claim 1, wherein both an inner peripheral face of the body cylinder and an inner peripheral face of the attachment cylinder are configured with a cone-shaped profile decreasing in diameter on progression toward a boundary between the body cylinder and the attachment cylinder.

6. The grommet of claim 1 further comprising an engagement portion that is formed at an outer periphery of the attachment cylinder, and that is configured to engage with a peripheral edge of the opening by resiliently deforming.

* * * * *